United States Patent [19]

Peterson

[11] Patent Number: 5,798,592
[45] Date of Patent: Aug. 25, 1998

[54] SIMPLIFIED ELECTRIC MOTOR CONSTRUCTION

[75] Inventor: Brian Peterson, Woodbury, Conn.

[73] Assignee: Tri-tech, Inc., Waterbury, Conn.

[21] Appl. No.: 770,378

[22] Filed: Nov. 29, 1996

Related U.S. Application Data

[63] Continuation-in-part of Ser. No. 398,093, Mar. 3, 1995, abandoned.

[51] Int. Cl.$^6$ .......................... H02K 21/14; H02K 1/04; H02K 5/04
[52] U.S. Cl. .................. 310/164; 310/162; 310/194; 310/89
[58] Field of Search ................. 310/49 R, 49 A, 310/162, 164, 89, 40 MM, 194, 254

[56] References Cited

U.S. PATENT DOCUMENTS

| | | | |
|---|---|---|---|
| 3,307,056 | 2/1967 | Woolley | 310/164 |
| 4,059,780 | 11/1977 | Mazuir | 310/164 |
| 4,107,559 | 8/1978 | Patel | 310/49 R |
| 4,185,214 | 1/1980 | Gerber et al. | 310/40 MM |
| 4,623,809 | 11/1986 | Westley | 310/49 R |
| 4,714,850 | 12/1987 | Akiba et al. | 310/49 R |
| 4,754,183 | 6/1988 | Gerber | 310/49 R |
| 4,841,190 | 6/1989 | Matsushita et al. | 310/49 R |
| 4,853,568 | 8/1989 | Fujiwara | 310/40 MM |
| 4,924,124 | 5/1990 | Kato | 310/49 R |
| 5,298,822 | 3/1994 | Bosman et al. | 310/49 R |

*Primary Examiner*—Clayton E. LaBalle
*Attorney, Agent, or Firm*—John H. Crozier

[57] ABSTRACT

In a preferred embodiment, in an electric motor of the type including a cup-shaped housing and a housing mounting plate, the improvement comprising: providing said cup-shaped housing and said housing mounting plate as a monolithic part. In another embodiment, an electric motor, including: first and second stator coils wound, respectively, on first and second bobbins; first and second stator poles closely engaging, respectively, slots defined in the first and second bobbins to radially align, respectively, the first and second stator poles with respect to the first and second bobbins; a central pole structure having formed thereon poles extending in proximity to the first and second bobbins; and alignment structure extending between the first and second bobbins and through the central pole structure to radially align the poles on the central pole structure with respect to the first and second bobbins and the first and second poles. In another embodiment, an electric motor, comprising: two bobbins disposed in a cup-shaped housing, the walls of the housing having a slight taper to permit a central pole structure to be secured in the housing by means of an interference fit. In another embodiment, an electric motor housing having no mounting flanges, including: a cup-shaped housing having a generally open end; and a cover closing the generally open end, the cover fitting within the outer periphery of the cup-shaped housing.

7 Claims, 5 Drawing Sheets

SIMPLIFIED ELECTRIC MOTOR CONSTRUCTION

CROSS-REFERENCE TO RELATED APPLICATION

The present application is a continuation-in-part of application Ser. No. 08/398,093, filed Mar. 3, 1995 now abandoned, and titled ELECTRIC MOTOR WITH MONOLITHIC MOUNTING FLANGE.

BACKGROUND OF THE INVENTION

1. Field of the Invention

The present invention relates to electric motors generally and, more particularly, but not by way of limitation, to a motor cup with a monolithic mounting flange.

2. Background Art

Some electric motors and, typically, subfractional electric motors have cup-shaped housings. Such housings have mounting flanges attached thereto by means of welding, brazing, riveting, or similar methods of attachment. Such an arrangement requires manufacturing labor to perform the attachment step. Furthermore, having two parts to form the finished cup requires additional parts handling and inventory.

A further disadvantage of conventional electric motors of the type having two stator coils is that each stator coil is disposed in a separate cup, with the two cups being subsequently joined. This further increases parts count and cost and requires additional manufacturing steps.

Yet another disadvantage of conventional electric motors of the type having two stator coils and a central pole structure disposed therebetween is that relatively complex means are provided to radially align the pole structure with respect to the two stator coils.

An occasional disadvantage of conventional electric motors is that the mounting flanges provided, which extend beyond the motor cup, interfere with particular desired applications.

An electric motor is known in which pins formed on the inner surfaces of the bobbins in the motor engage holes formed on a central pole plate for radial orientation purposes. A disadvantage of this construction is that the pole plate also includes tabs which protrude through slots formed in the wall of the motor cup. This requires forming the slots to rather close tolerances, thus increasing manufacturing cost.

Accordingly, it is a principal object of the present invention to provide an electric motor cup with mounting flange of monolithic construction.

An additional object of the invention is to provide an electric motor without mounting flanges.

A further object of the invention is to provide such electric motors that are economically constructed, with low parts count and simplified manufacturing operations.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, in an electric motor of the type including a cup-shaped housing and a housing mounting plate, the improvement comprising: providing said cup-shaped housing and said housing mounting plate as a monolithic part. In additional aspect of the invention, there is provided an electric motor, comprising: first and second stator coils wound, respectively, on first and second bobbins; first and second stator poles closely engaging, respectively, slots defined in said first and second bobbins to radially align, respectively, said first and second stator poles with respect to said first and second bobbins; a central pole structure having formed thereon poles extending in proximity to said first and second bobbins; and alignment means extending between said first and second bobbins and through said central pole structure to radially align said poles on said central pole structure with respect to said first and second bobbins and said first and second poles. In a further aspect of the invention, there is provided an electric motor, comprising: two bobbins disposed in a cup-shaped housing, said housing having an open top and a generally closed bottom, with a generally cylindrical sidewall extending around the periphery of said closed bottom and defining said open top; a central pole structure disposed between said two bobbins, orthogonal to said top and bottom of said housing, and having formed thereon poles extending in proximity to said two bobbins; and said sidewall having a slight taper, such that said open top is wider than said closed bottom, to permit said central pole structure to be secured in said housing by means of an interference fit. In yet another aspect of the invention, there is provided an electric motor housing having no mounting flanges, comprising: a cup-shaped housing having a generally open end; and a cover closing said generally open end, said cover fitting within the outer periphery of said cup-shaped housing.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1A:
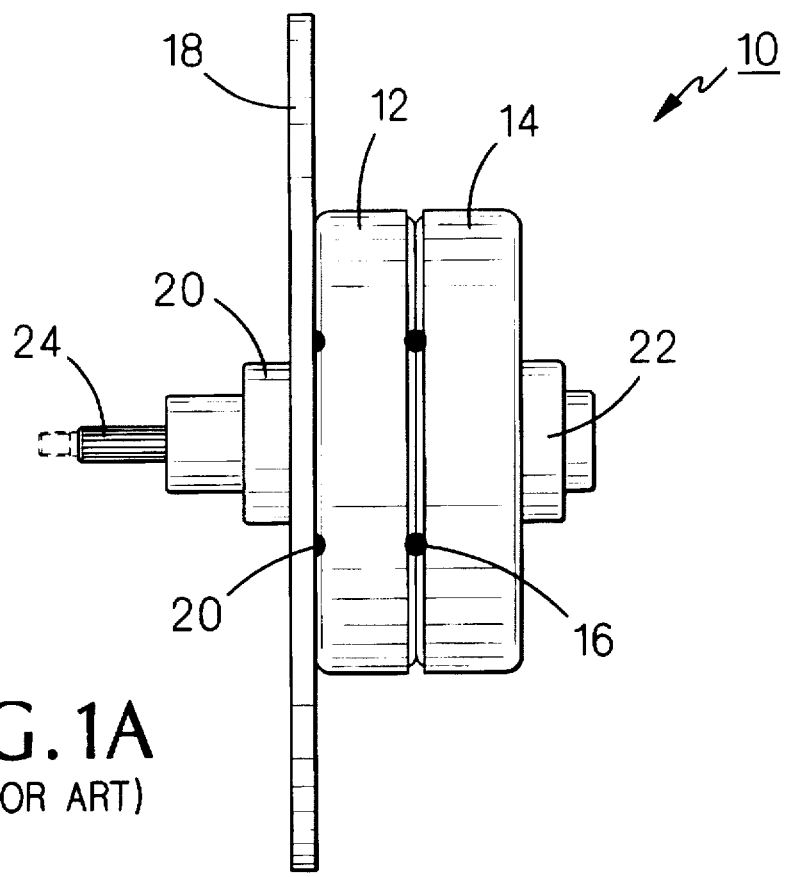
FIG. 1A is a side elevational view of a conventionally constructed electric motor.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

Figure 1B:
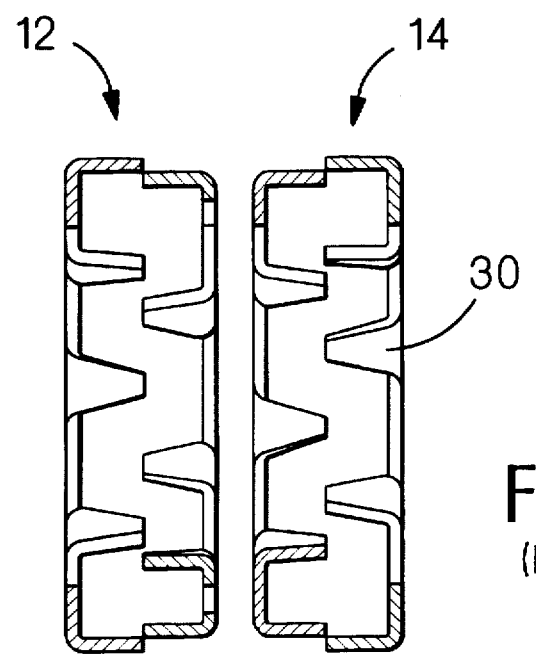
FIG. 1B is a fragmentary, side elevational view, partially cut-away, of the motor of FIG. 1.

FIG. 1 illustrates one type of conventional electric motor, generally indicated by the reference numeral 10. Motor 10 includes a housing comprising two cup assemblies 12 and 14 tack welded together, as at 16, a mounting plate 18 tack welded to cup assembly 12, a front bearing and shaft support member 20, a rear bearing support member 22, and a shaft 24. Although not relevant to the present invention, motor 10 is of the rotary linear type, with a shaft that moves axially in and out of the motor. FIG. 1B illustrates that each of cup assemblies 12 and 14 is formed of two half cups, pressed together with drawn poles, as at 30 formed on facing sides of the half cups.

Figure 2:
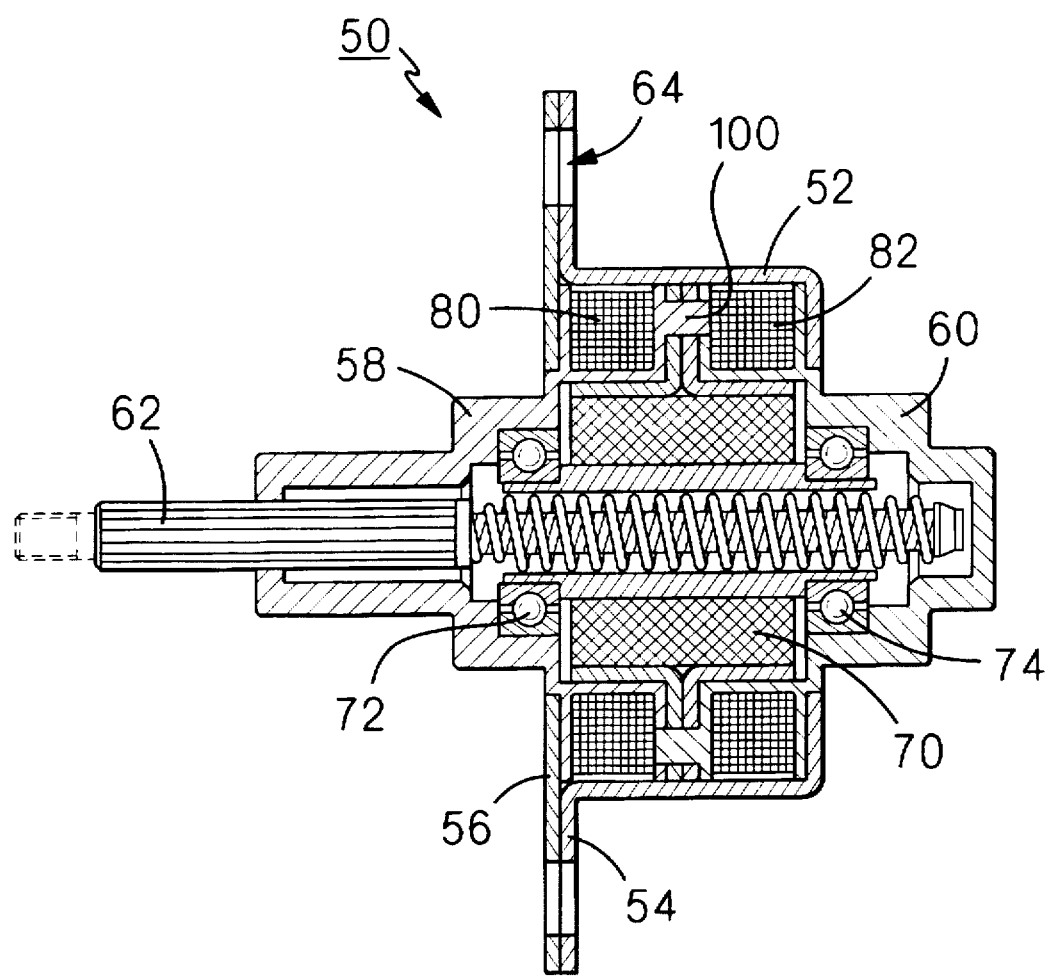
FIG. 2 is a side elevational view, partially in cross-section, of one electric motor constructed according to the present invention.
Figure 3:
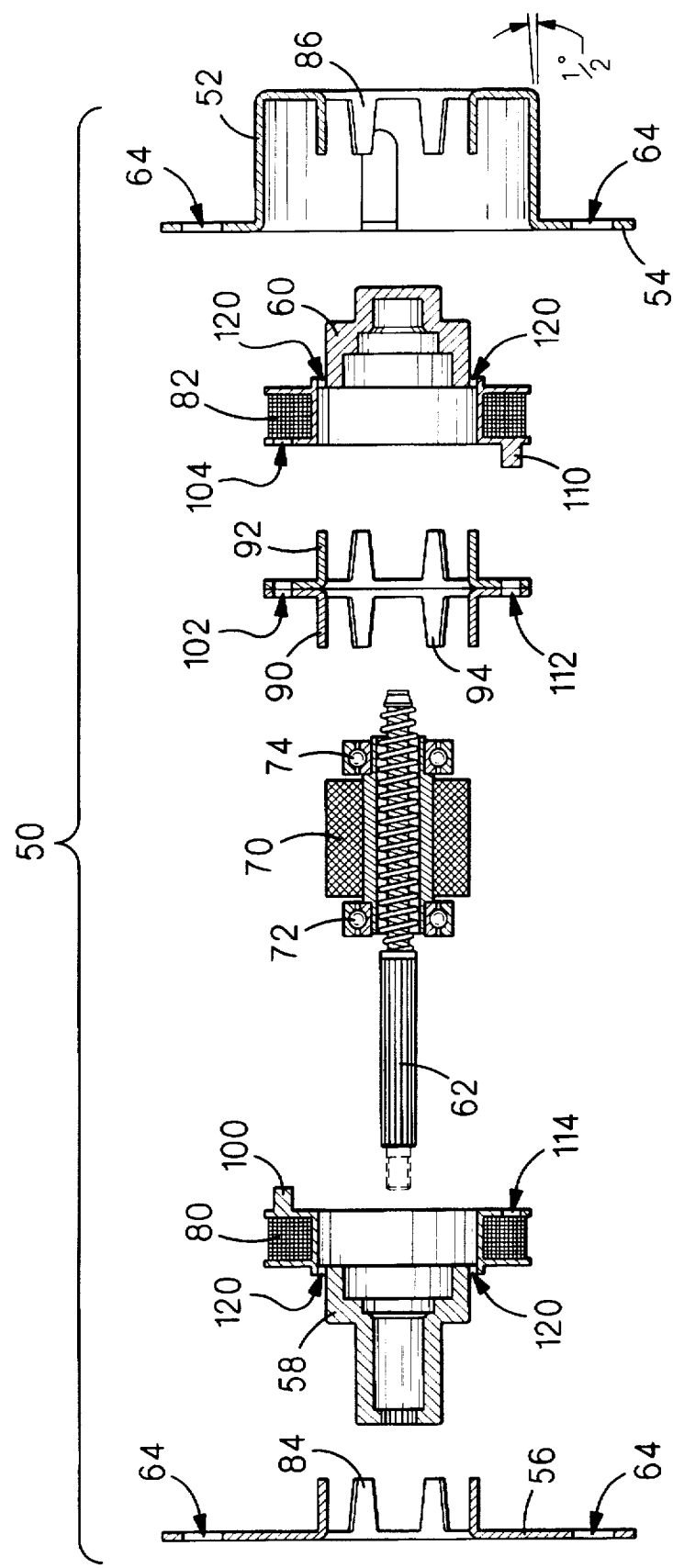
FIG. 3 is an exploded side elevational view, partially in cross-section, of the electric motor of FIG. 2.

FIGS. 2 and 3 illustrate a motor, generally indicated by the reference numeral 50 similar in general type to motor 10 (FIGS. 1A and 1B) described above, but constructed according to the present invention. Motor 50 includes a cup 52, a cup mounting flange 54, a cover plate 56, a front bearing and shaft support member 58, a rear bearing support member 60, a shaft 62, and aligned apertures 64 for the insertion therethrough of suitable fasteners (not shown) to attach the cover plate to the cup mounting flange and to mount motor 50 to other structure (not shown). Also shown are a rotor structure 70, with bearings 72 and 74, a first stator coil 80 wound on a bobbin extension of front bearing and shaft support 58, a second stator coil 82 wound on a bobbin extension of rear bearing support 60, drawn poles, as at 84 (FIG. 3), extending inwardly from a central aperture in cover plate 56, drawn poles, as at 86 (FIG. 3), extending inwardly from a central aperture in cup 52, and central pole plates 90 and 92 with drawn poles, as at 94 (FIG. 3) formed thereon.

As seen from inspection of FIGS. 2 and 3, cup 52 and cup mounting flange 54 are not formed from separate pieces and then joined, but are monolithic, having been formed in a conventional drawing process which may occur simultaneously with the drawing of poles 86 (FIG. 3). This arrangement eliminates the need for a separate joining step during manufacture of motor 50 and reduces parts count.

As most clearly seen on FIG. 3, bobbin extension of front bearing and shaft support 58 includes a inwardly facing alignment tab 100 extending orthogonally from the inner surface thereof and formed integrally therewith. When motor 50 is assembled (FIG. 2), the alignment tab fits snugly through an opening 102 defined through central pole plates 90 and 92 and into an opening 104 defined in the inner surface of the bobbin extension of rear bearing support 60. Similarly, the inner surface of the bobbin extension of rear bearing support 60 includes an alignment tab 110 which, when motor 50 is assembled, fits snugly through an opening 112 defined through central pole plates 90 and 92 and into an opening 114 defined in the inner surface of the bobbin extension of front bearing and shaft support 58. This arrangement permits the specific orientation of poles 94 on central pole plates 90 and 92 radially with respect to poles 84 and 86 extending inwardly, respectively, from cover plate 56 and cup 52, poles 84 and 86 being closely fitted into, and radially aligned by, a plurality of slots, as at 120, defined through the bobbin extensions of front and rear bearing supports 56 and 52, respectively. This arrangement also requires no alignment tabs on central pole plates 90 and 92 extending through slots formed in the sidewall of cup 52, as is the case with a known electric motor construction, thus reducing manufacturing cost.

A further feature of the present invention is also apparent from inspection of FIG. 2 where it is seen that both first and second stator coils 80 and 82 are disposed in single cup 52, as opposed to the construction of conventional motors in which the coils would be disposed in separate cups and the cups subsequently joined. The present invention provides for lower parts count and more simplified manufacturing procedures.

Yet another feature of the present invention is shown on FIG. 3 where it is indicated that the ID of cup 52 has a taper of about 1/2 degree, such that the ID of the base of the cup is less than the ID of the mouth of the cup. This slight taper permits back-to-back central pole plates 90 and 92 to be pressed into cup 52 with an interference fit, thus ensuring a good magnetic flux path for the pole plates, as well as providing for positioning of the pole plates and anti-rattling.

Figure 5:
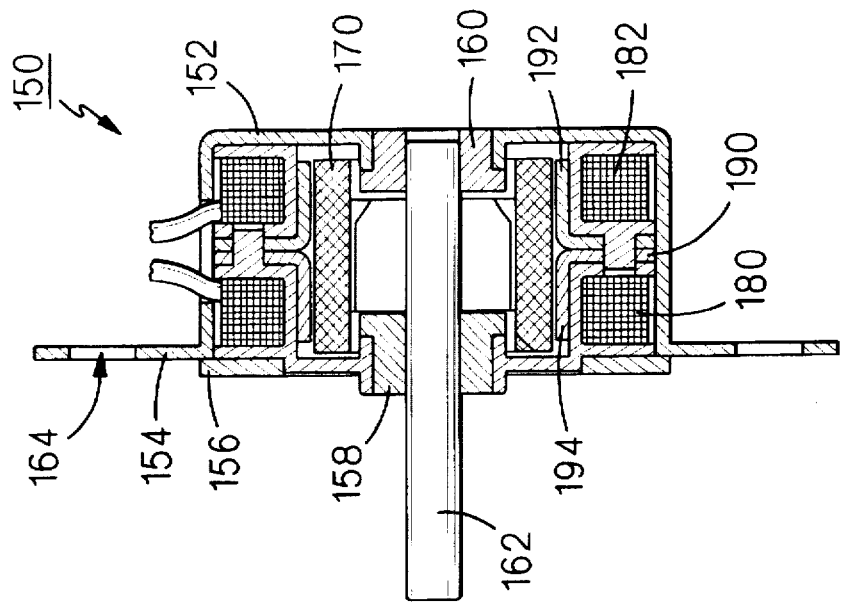
FIG. 5 is a side elevational view, partially in cross-section, of the motor of FIG. 4.
Figure 4:
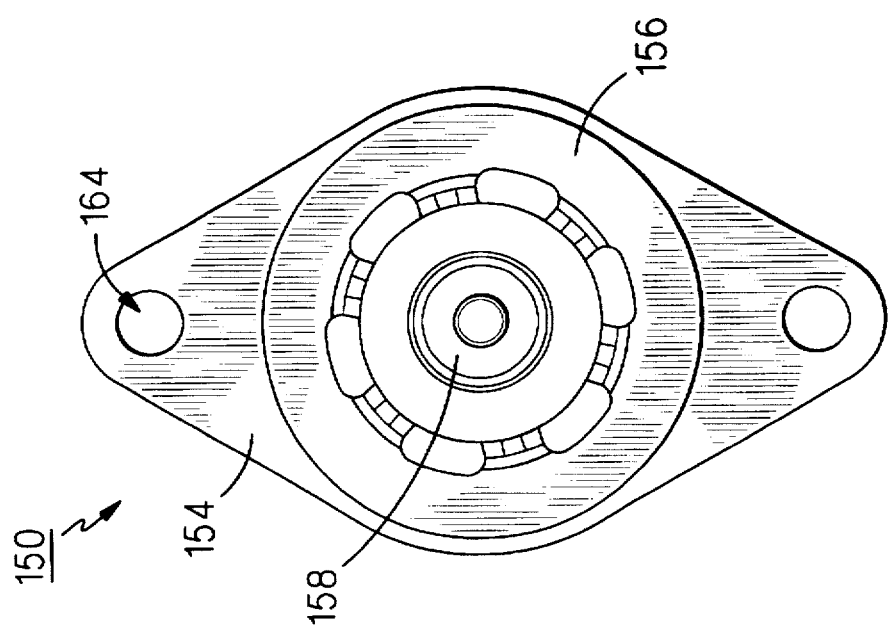
FIG. 4 is an end elevational view of another motor constructed according to the present invention.

FIGS. 4 and 5 illustrate another motor constructed according to the present invention, generally indicated by the referenced numeral 150. Elements of motor 150 similar to the elements of motor 50 (FIGS. 2 and 3) are given the same reference numerals as for motor 50, with the addition of the prefix "1". Motor 150 is a straight rotary motor and lacks the bearings 72 and 74 of motor 50, the function of which being provided by elements 158 and 160 of motor 150.

Figure 6:
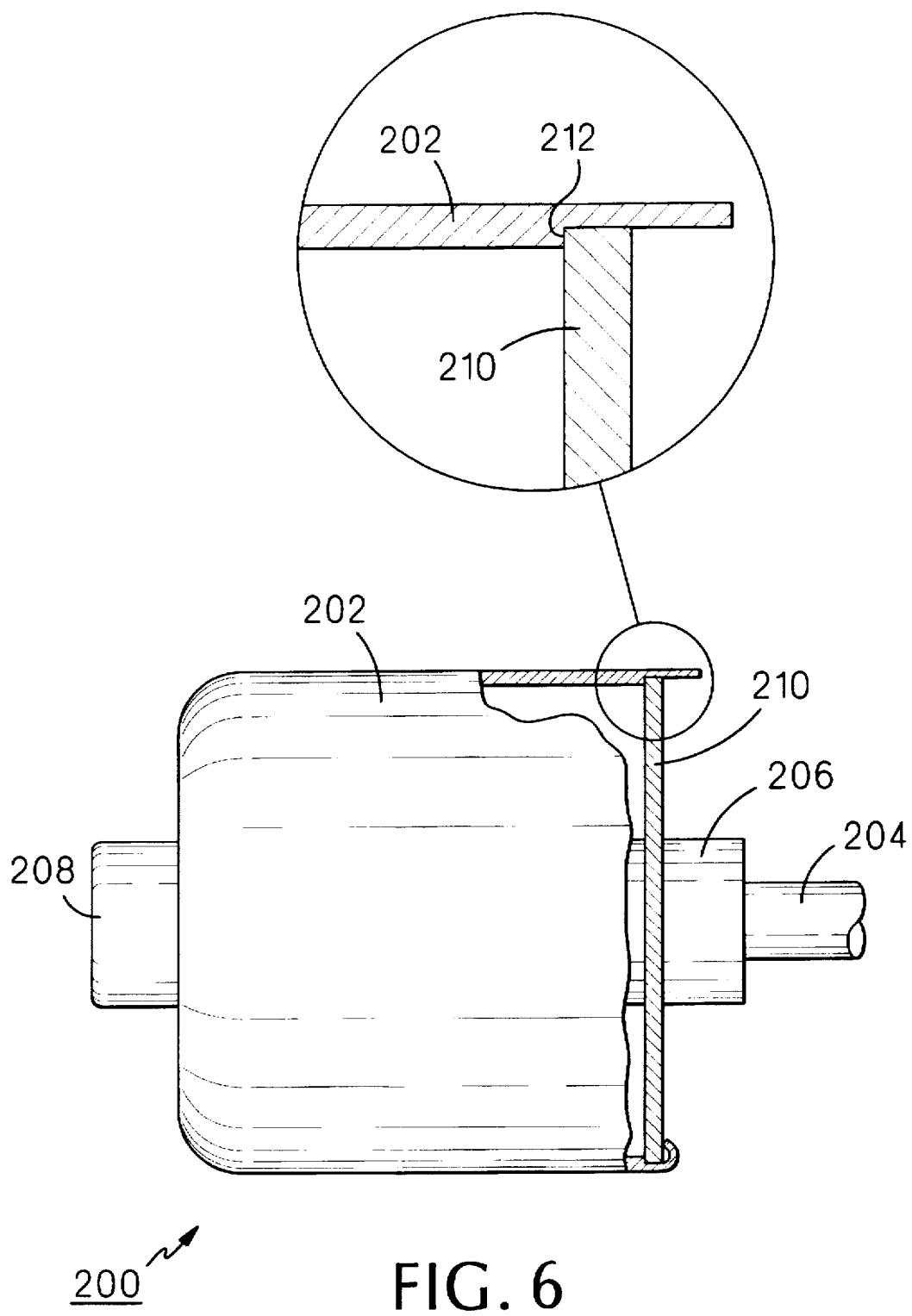
FIG. 6 is a side elevational view, partially in cross-section, of a motor without mounting flanges.

FIG. 6 illustrates an embodiment of the present invention for use in applications where mounting flanges are undesirable, the embodiment comprising an electric motor generally indicated by the reference numeral 200. Motor 200 may be either a rotary or a rotary/linear motor and includes a motor cup 202, a shaft 204, and front and rear bearing structures 206 and 208, respectively. In motor 200, rather than providing a mounting flange 54 and cover 56 (FIG. 3) as shown on motor 50, a cover 210 is provided for motor 200 which fits inside the outer periphery of motor cup 202.

While a number of arrangements can be provided for attaching cover 210 to cup 202, the preferred arrangement is to swage the lip of the cup to form a step 212 against which cover 210 is disposed. Cover 210 can then be crimped, as shown at the lower edge of motor 200, or the cover can be welded or brazed to the lip of cup 202.

Provisions (not shown) for the mounting of motor 200 to other structures may include clamping or threading various elements of the motor or an interference fit of one or more elements with the other structures.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. An electric motor, comprising:
   (a) first and second stator coils wound, respectively, on first and second bobbins;
   (b) first and second stator poles closely engaging, respectively, slots defined in said first and second bobbins to radially align, respectively, said first and second stator poles with respect to said first and second bobbins;
   (c) a central pole structure having formed thereon poles extending in proximity to said first and second bobbins; and
   (d) alignment means extending between said first and second bobbins and through said central pole structure to radially align said poles on said central pole structure with respect to said first and second bobbins and said first and second poles.

2. An electric motor, as defined in claim 1, wherein said alignment means comprises: at least a first tab formed on an inner surface of one of said first and second bobbins and extending through an opening defined through said central pole structure and into an opening defined in the other of said first and second bobbins.

3. An electric motor, as defined in claim 2, further comprising: a second tab formed on an inner surface of said other of said first and second bobbins and extending through an opening defined through said central pole structure and into an opening defined in said one of said first and second bobbins.

4. An electric motor, comprising:

(a) a open-ended cup-shaped housing having a monolithic mounting plate disposed at the open end thereof and extending orthogonally outwardly therefrom;

(b) a plurality of monolithic poles formed inwardly around a central aperture of said cup-shaped housing;

(c) a first stator coil wound on a first bobbin, said first bobbin being radially aligned in said cup-shaped housing by means of said poles formed inwardly around said central aperture inserted in and closely fitting slots defined in portions of said first bobbin;

(d) a central pole structure having formed thereon poles extending along a major axis of said cup-shaped housing, said central pole structure being radially aligned with said first bobbin by means of at least a first pin extending from said first bobbin and inserted through and closely fitting at least a first opening defined in said central pole structure, said central pole structure being press fitted into said cup-shaped housing without any elements of said central pole structure protruding through said cup-shaped housing;

(e) a stator structure inserted into a central opening in said first bobbin;

(f) a second stator coil wound on a second bobbin, said second bobbin being radially aligned with said central pole structure by means of at least a second pin extending from said second bobbin and inserted through and closely fitting at least a second opening defined in said central pole structure, said stator structure extending into a central opening in said second bobbin; and (g) a cover plate for said cup-shaped housing, said cover plate having monolithic poles formed around a central aperture of said cover plate, said cover plate being radially aligned with said second bobbin by means of said monolithic poles of said cover plate being inserted in and closely fitting slots defined in portions of said second bobbin, and said cover plate engaging said mounting flange.

5. An electric motor, as defined in claim 4, wherein:

(a) said at least a first pin extends from said first bobbin, through said at least a first opening, and into at least a first slot defined in said second bobbin; and (b) said at least a second pin extends from said second bobbin, through said at least a second opening and into at least a second slot defined in said first bobbin.

6. An electric motor, as defined in claim 4, wherein: a sidewall of said cup-shaped housing has a slight taper, with said open end thereof having a diameter greater than a diameter of a bottom of said cup-shaped housing to facilitate the press fitting of said central pole structure into said cup-shaped housing.

7. An electric motor, as defined in claim 6, wherein: the angle of said slight taper is on the order of about one-half degree.

\* \* \* \* \*